United States Patent [19]

Moreno et al.

[11] Patent Number: 4,832,396

[45] Date of Patent: May 23, 1989

[54] MAGNETIC STRIP FOR PICK UP CAMPER SHELLS ETC.

[76] Inventors: Albert F. Moreno; George Spector, both of 233 Broadway, Rm 3615, New York, N.Y. 10007

[21] Appl. No.: 692,345

[22] Filed: Jan. 16, 1985

[51] Int. Cl.[4] .............................................. B60P 3/32

[52] U.S. Cl. ................................. 296/164; 52/309.4; 52/DIG. 4; 49/478

[58] Field of Search ................. 296/10, 156, 164, 166, 296/167; 49/478, 490, 482, 493; 52/DIG. 4, 309.4, 465, 403; 220/230

[56] References Cited

U.S. PATENT DOCUMENTS

| | | | |
|---|---|---|---|
| 1,912,255 | 5/1933 | Clark | 48/493 |
| 2,627,097 | 2/1953 | Ellis | 49/478 |
| 2,671,935 | 3/1954 | Flues | 49/493 |
| 2,727,650 | 12/1955 | Moynihan et al. | 220/230 |
| 3,111,728 | 11/1963 | Alderfer | 49/478 |
| 3,145,434 | 8/1964 | Major | 49/493 |
| 3,147,176 | 9/1964 | Haslam | 49/478 |
| 3,518,792 | 7/1970 | Williamson et al. | 49/488 |
| 3,857,601 | 12/1974 | Robbins | 296/10 |
| 4,094,271 | 6/1978 | Louis | 49/482 |
| 4,099,763 | 7/1978 | Maier et al. | 49/493 |

*Primary Examiner*—Dennis H. Pedder

[57] ABSTRACT

A magnetic weather strip for making a weather proof seal between three panels around an open bed of a pick up truck and the overhanging portion of a camper body on the bed is provided and consists of a flexible magnetic strip attached to a strip of insulative material along one longitudinal recessed edge thereof and magnetically attached to top of the panels.

3 Claims, 1 Drawing Sheet

MAGNETIC STRIP FOR PICK UP CAMPER SHELLS ETC.

BACKGROUND OF THE INVENTION

The instant invention relates generally to magnetic gaskets and more specifically it relates to a magnetic weather strip for sealing a space between a camper unit carried on an open bed of a motor vehicle.

Numerous magnetic gaskets have been provided in prior art that are adapted to seal spaces between objects. For example, U.S. Pat. Nos. 3,119,158; 3,124,725 and 3,850,471 all are illustrative of such prior art. While these units may be suitable for the particular purpose to which they address, they would not be as suitable for the purposes of the present invention as heretofore described.

SUMMARY OF THE INVENTION

A principle object of the present invention is to provide a magnetic weather strip that is basically a foam rubber strip with a magnetic flexible strip molded together.

Another object is to provide a magnetic weather strip that is especially designed for sealing a space between a camper unit carried on an open bed of a pick up truck.

An additional object is to provide a magnetic weather strip that can be used as a temporary weather stripping without having to drill holes or to be glued so that it can be removed and applied as often as needed.

A further object is to provide a magnetic weather strip that is simple and easy to use.

A still further object is to provide a magnetic weather strip that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
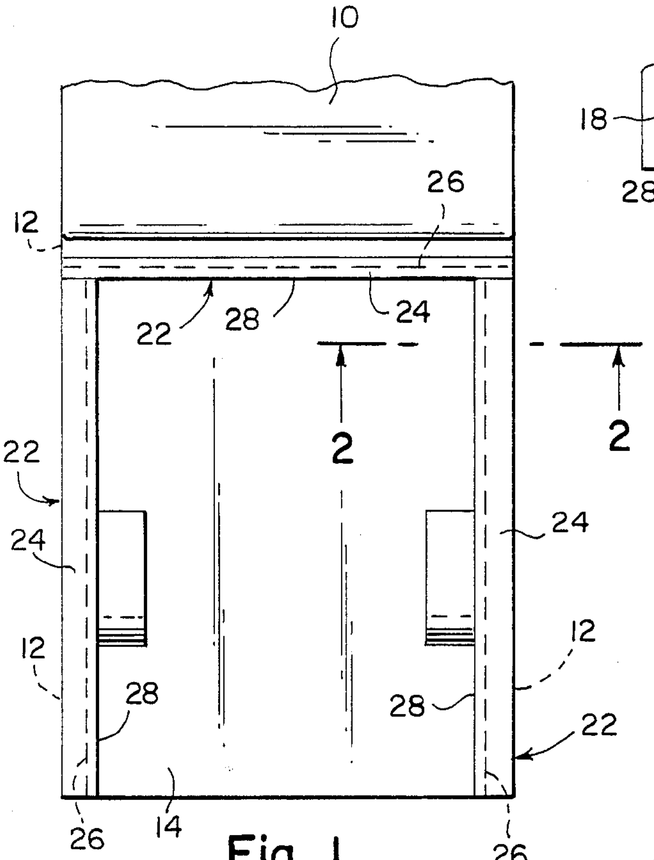
FIG. 1 is a top view of a pick up truck with the invention installed on top of the three panels around the bed.
Figure 2:
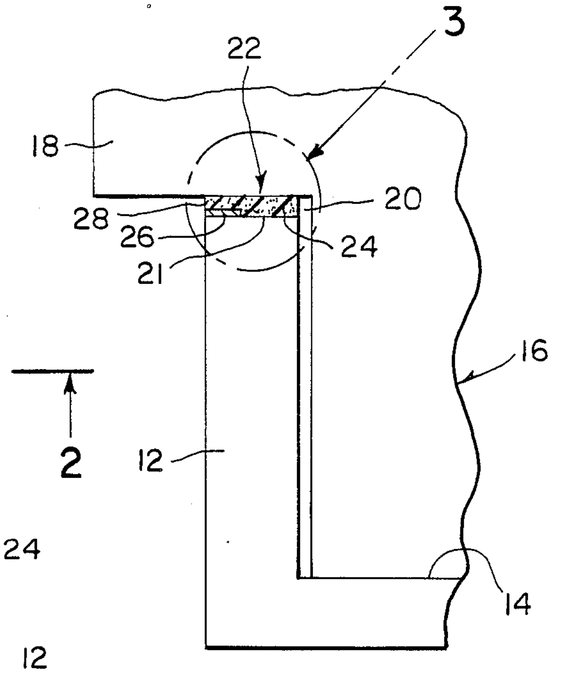
FIG. 2 is an enlarged cross sectional view taken along line 2—2 in FIG. 1 showing the overhanging portion of the camper body engaging the invention on top of one of the panels.

Turning now descriptively to the drawings, in which similar reference characters denote similar elements throughout the several views, FIGS. 1 and 2 illustrates a vehicle 10, such as a pick up truck, that has three panels 12 around an open bed 14. The bed 14 carries a camper body 16 that has an overhanging portion 1B, thereon. The circumference of the camper body 16 is smaller than the circumference of the panels 12 on the bed 14 thereby to define a peripheral space 20 between the camper body 16 and the panels 12. A magnetic weather strip 22 extends around the camper body 16 within the peripheral space 20 between the overhanging portion 18 of the camper body 16 and tops 21 of the panels 12. The magnetic weather strip 22 is removably attached to the tops 21 of the panels 12 to provide a weatherproof seal between the panels 12 and the camper body 16.

Figure 3:
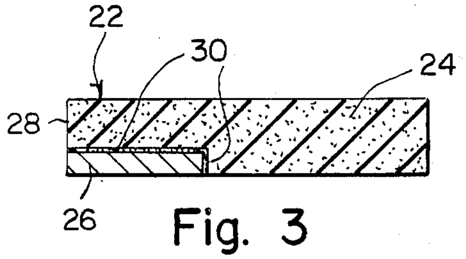
FIG. 3 is a greatly enlarged cross sectional view of the invention.

As best seen in FIG. 3 the magnetic weather strip 22 consists of a strip of insulative material 24, such as foam rubber and a flexible magnetic strip 26 attached to the insulative material 24 along one longitudinal recessed edge 28 thereof and magnetically attached to the tops 21 of the panels 12 of the bed 14 of the vehicle 10. The magnetic weather strip 22 further contains adhesive material 30 for attaching the flexible magnetic strip 26 to the ingulative material 24.

Figure 4:
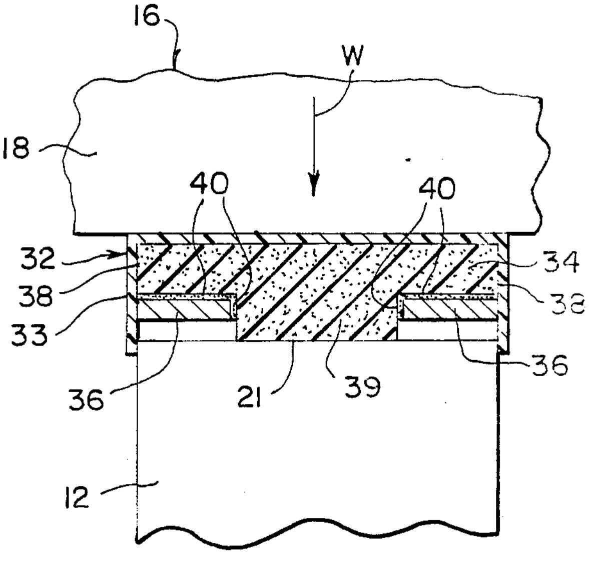
FIG. 4 is a greatly enlarged cross sectional view of a modification showing a double magnetic weather strip within a relatively rigid bendable backing holder for a better seal with the camper body.
Figure 5:
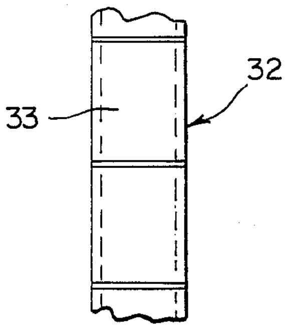
FIG. 5 is a partial top view of the modification shown in FIG. 4 having a segmented backing.

FIGS. 4 and 5 show a modified magnetic weather strip 32 which consists of a relatively rigid bendable segmented backing holder 33, a strip of insulative material 34, such as foam rubber, held within the U-shaped backing holder 33 and a pair of flexible magnetic strips 36. Backing holder 33 fits over and along the vertical sides of panel 12. Each magnetic strip 36 is attached to the insulative material 34 along one longitudinal recessed edge 38 thereof and is magnetically attached to the tops 21 of the panels 12 of the bed 14 of the vehicle 10. When the weight of the overhanging portion 18 as indicated by arrow W presses downwardly onto the magnetic weather strip 32, center portion 39 of the insulative material 34 compress and magnetic strips 36 engage panels 12 for a better seal thereon. Prior to compression portion 39 protrudes beyond strips 36. The magnetic weather strip 32 further contains adhesive material 40 for attaching the flexible magnetic strips 36 to the insulative material 34. Weather strips 32 are slideable along panels 12 for proper positioning prior to compression with said panel fitting within said holder.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A magnetic weather strip adapted to be removeably attached to vertical panels of a truck to provide support and provide a weather proof seal between said panels and a camper body mounted on said panels, said magnetic weather strip comprising:

(a) a relatively rigid bendable segmented backing holder;

(b) a strip of insulative material held within said backing holder; and (c) spaced flexible magnetic strips, each attached to said insulative material along recesses whereby said material protrudes beyond said magnetic strips so that when the weight of said body presses downwardly onto said magnetic weather strip, said protruding insulative material compresses against said panels and said strips magnetically engage said panels for a better seal.

2. A weather strip as in claim 1, wherein said holder is U-shaped and fits slidingly over said panels.

3. A weather strip as per claim 2, wherein said magnetic strips are symmetrically located on either side of the protruding material.

* * * * *